Patented Mar. 18, 1930

1,750,795

UNITED STATES PATENT OFFICE

GEORGE DEFREN, OF NEWTON, MASSACHUSETTS

PROCESS OF TREATING CACAO BEANS

No Drawing.    Application filed January 4, 1926. Serial No. 79,269.

This invention relates to a process for treating the cacao bean to improve the flavor and quality of the roasted bean.

The cacao bean of commerce is obtained from the raw bean which lies imbedded in a mass of pulp in a pod. The pods are broken up and the seeds or beans removed. Some of the pulp remains attached to the bean. The beans and the pulp are "sweated" or fermented to decompose much of the pulp adhering to the bean. The sweating produces various fermentation products, such as acids, both volatile and non-volatile, some of which are formed in, and also absorbed by, the bean and remain therein on drying. During the fermentation process the enzymes present in the bean are also active, affecting the carbohydrate, protein, glucoside, and other products. After fermentation the beans are dried, and are then ready for the market.

The commercial bean, as above prepared, contains a kernel enclosed in a shell, or skin, which adheres more or less tenaciously to the kernel. In some beans portions of the shell are attached to the kernel so strongly that they are not removed by the usual winnowing processes and so pass into the cacao products as an impurity.

The bean, ordinarily, is not used in its raw state but is roasted at a temperature upwards of 100° C. for a suitable time, to remove moisture and some of the volatile acids, and to develop the aroma. The roasted bean is then cracked and subjected to a blast of air, or winnowed, to remove the shell. The remaining broken kernels, or "nibs", are then finely ground, thereby to form "chocolate liquor" if the cacao butter, which comprises about 50% of the bean, is left therein; or "cocoa" or "cocoa powder" if a large proportion of the cacao butter is removed.

The raw unroasted bean is acid, acrid or bitter. The acid and bitter qualities vary with the type of bean, the conditions under which they are fermented and the localities in which they are grown. Some beans are less acid and bitter than others and so command higher prices as the chocolate liquor or cocoa powder made from such beans has a more desirable flavor.

The acid, acrid and bitter constituents of the bean comprise various acids, as acetic, lactic, tartaric, tannic and the like, together with various salts. Some of the acid constituents are volatile and can be driven off more or less during the roasting process. The bitter constituents are relatively non-volatile and so are not appreciably affected by the roasting process. The roasted bean, therefore, contains about all of its bitter constituents and a considerable proportion of its acid constituents. Consequently, the chocolate liquor and cocoa powder made from many varieties and grades of cocoa beans are inferior because of the large proportion of acid and bitter constituents, which constituents are retained by the ordinary process.

An object of this invention is a process for improving the quality of the roasted bean, and the chocolate liquor and cocoa powder prepared therefrom, by extracting the major portion of those constituents which impart acidity or bitterness to the bean, while retaining in the bean those milder components which characterize the bean.

A further object is to modify the physical structure of the bean prior to the roasting operation, in such a manner that the bean can be roasted more rapidly, and more uniformly throughout it, than heretofore, and to cause the shell of the bean to become brittle and to separate from the kernel more easily during the roasting and winnowing operations.

In carrying out these objects of my invention, I remove or extract the acid and bitter constituents of the bean by soaking the unroasted bean in a solvent for such constituents, which solvent preferably comprises essentially water, since I have found that most of the acid and bitter constituents are more or less soluble in water while those constituents which impart to the bean its desirable characteristic aroma and flavor, and other properties, are not readily soluble in water, at least under the conditions by which I carry out my process. Under some conditions, however, I may use some other suitable solvent. While water at any temperature possesses solvent power in some degree on some of the undesirable constituents of the cocoa bean, I prefer to use water at a temperature at least equal to the melting temperature of the cacao butter in the beans and sufficiently high, say about 60° C., to maintain the beans sterile, or to prevent fermentation, or the growth of bacteria, or moulds during the soaking process; and the temperature preferably is maintained throughout the major extent of the time of soaking. The time during which the soaking or extraction process continues is determined by experience; some beans require a longer time than others. Usually the time increases with the degree of acidity or bitterness of the bean. For Accra beans a period of twelve hours produces satisfactory results; for beans of a better grade a less period of time will be sufficient. Ordinarily, a period of from two to twelve hours, depending upon the character of the beans, will give satisfactory results. The soaking process may be effected in any suitable manner and by any suitable apparatus. The beans may be placed in vats containing hot water, or the beans may be subjected to a stream of hot water. The soaking process acts to dissolve the acid and bitter constituents of the bean, the major portions of which constituents are soluble in water. The hot water also softens the shell of the bean and enlarges the cellular structure thereof and softens and dissolves the material which attaches the shell to the kernel, thereby more or less completely loosening the kernel from the shell. The hot water softens the cacao butter in the cells of the kernel and thereby permits the soluble constituents of the kernel to enter into solution in the water by diffusion through the cell membranes, and by capillarity. As the outer cells become enlarged and cleared, the process continues inwardly toward the interior of the kernel until finally the major portion of the acid and bitter constituents have been withdrawn from the interior of the beans by diffusion and have passed into solution in the water and the water has acquired a sour, acid or bitter taste. If the beans are soaked in vats, the water in the vats may be changed, from time to time, to keep down the concentration of the extracted constituents in the water. If desired a small amount of an antiseptic, as chloride of lime, for instance, may be added to the water.

When the soaking process has been completed the wet beans preferably are immediately dried and roasted. The immediate drying and roasting of the wet bean constitutes a further step in the process, by which the cells of the beans are enlarged and the cell structure is modified by the action of the hot vapor of the moisture, and the shells are detached from the kernels by the rapid formation of vapor in the bean and under the shell.

If desired, the wet beans may be treated in a centrifugal machine, between the soaking and roasting steps, to remove the surface water on the beans.

During the roasting process, the moisture in the interior of the bean is vaporized relatively rapidly and the vapor acts mechanically to carry out of the bean some of the volatile acid constituents which might otherwise remain in the bean itself. The formation of vapor within the bean serves to open or enlarge the cells of the bean and break down the cell walls and to render the bean more susceptible to the roasting process so that the bean becomes more uniformly roasted throughout, and the roasted kernel, or nib, has, to a greater degree, the desired property of crispness, brittleness, or friability than heretofore. The soaking process removes the substances which had caused the adhesion of the shell to the kernel and opens the cells of the shell so that the shell, during roasting, becomes brittle and friable. The pressure of the water vapor formed between the kernel and the shell serves to force the shell from any adherency it may yet have with the kernel. The movement and agitation of the beans during the combined drying and roasting process also assists in breaking the shell and in freeing it from the kernel. The completeness of the detachment of the kernel and shell is such that the winnowing process, which follows the roasting process, effects the removal of the broken shells from the roasted kernels and the resulting nibs are substantially free of any shell particles.

I prefer to employ a continuous system of soaking, drying, and roasting, utilizing a blast, or stream, of hot air or gases to remove moisture as rapidly as possible.

The roasted bean prepared in accordance with this invention has increased crispness and friability. It is smooth and bland and is substantially free from bitterness and acidity as compared with the same kind of bean which has not been thus treated. I have found that the chocolate liquor produced from beans by my process is lighter in color than the liquor produced from the untreated bean.

My process has most value in connection with beans of the lower grades, which are of marked acidity or bitterness, and serves to remove not only the greater portion of the acidity and bitterness but also to enhance the characteristic chocolate flavor of the bean, the constituents of which are not removed to any appreciable degree by the soaking process. My process also removes an appreciable percentage of soluble salts from the bean, thus reducing the percentage of ash, which is a desirable result. I have found, also, that the yield of cacao butter from the ground roasted bean is materially increased by the above treatment.

I am aware that it has been the practice, sometimes, to wash the fermented beans in water at the plantations where they are grown but this is purely for the purpose of removing some of the adhering fermented pulp from the surface of the bean, to improve the appearance thereof.

It is also the practice of some chocolate manufacturers to add alkaline water solutions to the beam nibs, or liquor, a process commonly called "dutching", for the purpose of neutralizing, more or less completely, the acidity of the bean. Such practices, however, are not effective in removing any material amounts of the bitter constituents of the bean and, in the dutching process, the salts formed by the alkali treatment remain in the bean, thereby increasing the ash content of the bean.

In the claims, I have used the term "bitter constituents" to include all soluble constituents which impart a disagreeable flavor to the roasted bean, and other than the characteristic chocolate flavor, whether the disagreeable flavor is bitter, or acid, or otherwise.

I claim:

1. The process of treating cacao beans which consists in soaking the raw bean in water until the bean is materially permeated with water, and then in roasting the wet bean.

2. The process of treating cacao beans which consists in soaking the raw bean in water until the bean is materially permeated with water, removing surface water from the bean, and then roasting the wet bean.

3. The process of treating raw cacao beans preparatory to roasting which comprises soaking the raw beans in water, which is initially free from constituents that are to be extracted from the beans, for a sufficient period of time whereby to remove at least the greater part of the soluble bitter constitutents of the beans.

4. The process of treating raw cacao beans preparatory to roasting which comprises soaking the raw beans in water, which is initially free from constituents that are to be extracted from the beans, for a sufficient period of time whereby to remove at least the greater part of the soluble bitter constituents of the beans, and changing the water to keep down the concentration of the extracted constituents in the water.

In testimony whereof, I have signed my name to this specification.

GEORGE DEFREN.